United States Patent
Heuer et al.

(10) Patent No.: US 6,507,428 B1
(45) Date of Patent: Jan. 14, 2003

(54) ARRANGEMENT BASED ON POLY-(3, 4-DIOXYTHIOPHENE) DERIVATIVES WHICH ARE ELECTROCHROMICALLY SWITCHED WITH PROTONS

(75) Inventors: Helmut-Werner Heuer; Rolf Wehrmann, both of Krefeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/806,692

(22) PCT Filed: Sep. 23, 1999

(86) PCT No.: PCT/EP99/07104

§ 371 (c)(1),
(2), (4) Date: Apr. 3, 2001

(87) PCT Pub. No.: WO00/20528

PCT Pub. Date: Apr. 13, 2000

(30) Foreign Application Priority Data

Oct. 6, 1998 (DE) .......................................... 198 45 881

(51) Int. Cl.[7] .............................................. G02F 1/153
(52) U.S. Cl. ........................ 359/273; 359/265; 359/268; 359/274; 252/586
(58) Field of Search ................................ 359/265–275; 252/582, 586

(56) References Cited

U.S. PATENT DOCUMENTS

| | | | | |
|---|---|---|---|---|
| 3,280,701 A | | 10/1966 | Donnelly et al. ............ | 359/267 |
| 4,887,890 A | | 12/1989 | Scherber et al. ............ | 359/265 |
| 4,902,108 A | | 2/1990 | Byker ......................... | 359/265 |
| 5,140,455 A | | 8/1992 | Varaprasad et al. ......... | 359/275 |
| 5,151,816 A | | 9/1992 | Varaprasad et al. ......... | 359/275 |
| 5,187,608 A | | 2/1993 | Blohm et al. ................ | 359/273 |
| 5,300,575 A | | 4/1994 | Jonas et al. .................. | 525/186 |
| 5,657,149 A | | 8/1997 | Buffat et al. ................. | 359/275 |
| 5,766,515 A | * | 6/1998 | Jonas et al. .................. | 252/500 |
| 6,083,635 A | * | 7/2000 | Jonas et al. .................. | 252/500 |
| 6,157,479 A | * | 12/2000 | Heuer et al. ................. | 252/500 |
| 6,175,441 B1 | * | 1/2001 | Heuer et al. ................. | 359/265 |
| 6,323,988 B1 | * | 11/2001 | Heuer et al. ................. | 359/265 |
| 6,327,070 B1 | * | 12/2001 | Heuer et al. ................. | 252/583 |

FOREIGN PATENT DOCUMENTS

| | | |
|---|---|---|
| EP | 0942061 | 9/1999 |
| WO | 96/03475 A1 | 2/1996 |

OTHER PUBLICATIONS

J. Electrochem. Soc., vol. 140, No. 12, pp. 3560–3564, Dec. 1993, Transmission Spectra of an Electrochromic Window Based on Polyaniline, Prussian Blue and Tungsten Oxide. B.P. Jelle and G. Hagen.

Houben–Weyl, Methoden der organischen Chemie, vol. E20, Makromolekulare Stoffe, Part 2 (month unavailable), pp. 1141–1143 x) von Acryl–Verbindunge, Dr. Günter Schröder (1987) No English translation available.

* cited by examiner

*Primary Examiner*—Evelyn A Lester
(74) *Attorney, Agent, or Firm*—Joseph C. Gil; Diderico van Eyl

(57) ABSTRACT

The invention relates to electrochromic arrangements in a layered structure which are characterized in that one layer contains an electrically conductive electrochromic polydioxythiophene, another layer comprises an electrolyte containing a protonic acid, and another layer comprises an ion storage or a mixture of ion storages.

8 Claims, 1 Drawing Sheet

Figure 1:
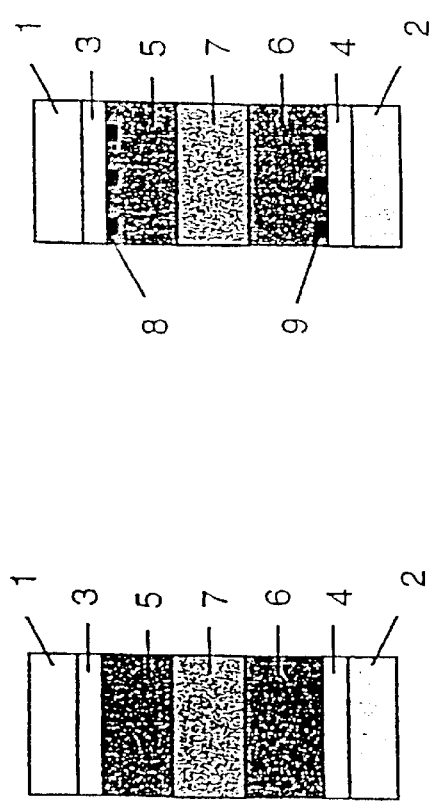
Figure 1:
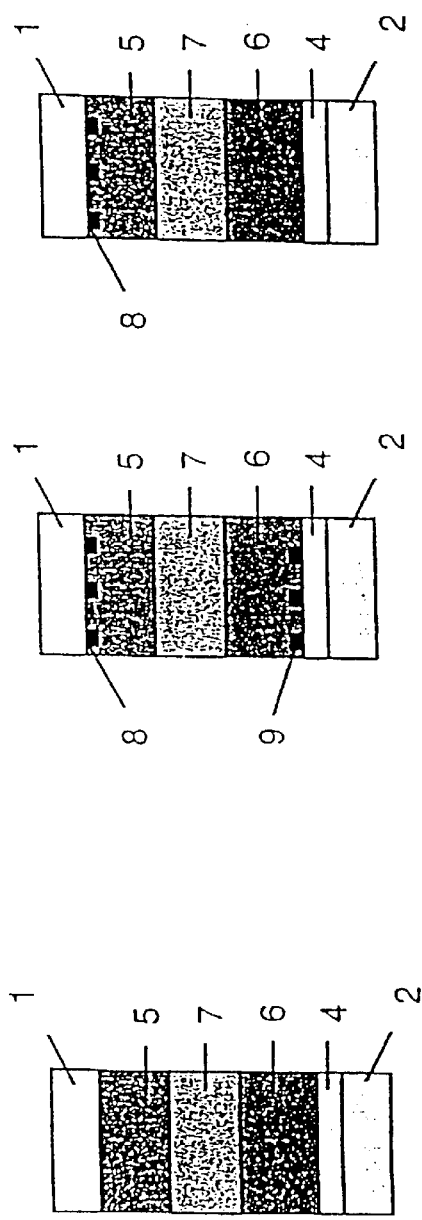

ARRANGEMENT BASED ON POLY-(3, 4-DIOXYTHIOPHENE) DERIVATIVES WHICH ARE ELECTROCHROMICALLY SWITCHED WITH PROTONS

This application is the National Stage Application of PCT/EP99/07104, which claims a priority from German Application 198 45 881.9, filed Oct. 6, 1998.

The present invention relates to electrochromic assemblies having controllable light transmittance, their production and their use.

Windows of vehicles have hitherto not been able to be regulated in terms of their transparency to electromagnetic radiation. Phototropic glasses have hitherto only been used for spectacles and have only a relatively small change in the transmission. Windows in buildings have hitherto been darkened using curtains, shutters, roller blinds or other movable mechanical elements. Electrochromic devices can thus be applied in many ways. In summary, examples are:

1. Vehicle Glazing (window panes or sunroofs in cars)

An electrochromic device is suitable for protection against sun or dazzling in motor vehicles. Front, side and rear windows or glass roofs can be included. The degree of darkening can be matched zonewise and steplessly to the needs of the driver, to the state of the sun and to the current driving situation. Integration into a computerized control system is possible. A combination of the active element with a composite glazing unit is likewise possible, for example application of a film system to panes of safety glass.

The transmittance of the panes can be controlled manually or automatically, which can be used for effective protection against dazzling during night driving, automatic adjustment of the brightness level when driving in and out of tunnels and multistorey carparks and for protection against breaking-in and theft of the parked vehicle by preventing vision into the vehicle interior. Excessive heating of the interior in summer, particularly in the case of a parked vehicle, can be prevented (cf. EP-A 0 272 428).

2. Glazing of Buildings (electrochromic window)

In buildings, electrochromic assemblies are suitable for darkening side windows and skylights of buildings, dwelling rooms, workrooms or greenhouses as controllable protection against sun (visible spectral region) and heat (IR region) and for protecting the eyes (visible spectral region). For protection against break-ins, glazing of bank counters or display windows can be darkened at the press of a button. Glass doors can be made visible automatically on approach of a person in order to avoid injury. The opportunity of producing virtually all shades of colour also makes it possible to blend the glazing into the facade of a building. The energy consumption for controlling the transparency of large areas of window is low, particularly when the memory effect of the system can be exploited and energy is only consumed in the switching phase. A combination with heat-protection glazing (K glass) is very suitable for achieving dynamic control of solar radiation through a window ("smart window"). An electrochromic system can thus contribute to regulating and limiting the energy necessary for air conditioning of a building.

The voltage supply to the system can also be provided by solar modules. A light-sensitive sensor can determine the degree of solar radiation and thus control the light transmittance.

3. Display Elements

The ability to produce attractive colours and the large-area portrayal of any contours, e.g. letters, figures, signs and symbols (able to be produced by means of suitable structuring techniques) provides advertising with an interesting medium. Decorative and informative effects are readily possible.

Apart from the possibility of arranging the system between panes of glass, there is also the alternative of using two or even only one transparent plastic film as support. This makes possible poster-like advertising media with changeable information.

Electrochromic devices can be used for small display elements such as faces of clocks or dials of measuring instruments, displays for a wide variety of applications and for large display elements such as traffic signs, advertising columns, information displays at railway stations, airports or for parking direction systems. Use as a variable delineation system (playing area boundaries, etc.) in sports halls is likewise possible.

The use of such systems is generally possible wherever information is to be made visible.

4. Optics

In optics, electrochromic systems can be used either in combination with glasses, lenses and filters of other optical instruments or as sole actively used component. Their use as lap dissolve protection for optical detection systems is likewise possible. The system is likewise suitable as a controllable filter system in photographic processes.

5. Mirrors

An electrochromic device can also be used as a dimmable mirror, e.g. in an automobile as external or rear-view mirror which can be darkened by application of an electric potential and thus prevents dazzling by the headlights of other vehicles (cf., for example, U.S. Pat. No. 3,280,702, U.S. Pat. No. 4,902,108 (Gentex), EP-A 0435 689, U.S. Pat. No. 5,140,455). A disadvantage of systems according to the prior art (solution systems) is the colour inhomogeneity after prolonged operation (segregation), particularly in the case of large mirrors (e.g. mirrors for heavy goods vehicles). Increasing the viscosity of the solution system by addition of polymeric thickeners has been described (e.g. U.S. Pat. No. 4,902,108).

6. EMI Shielding

An electrochromic device can also be used as a variable filter element for the modulation of electromagnetic radiation in certain wavelength regions.

Electrochromic devices normally comprise a pair of glass or plastic plates of which, in the case of a mirror, one is mirrored. One side of these plates is coated with a light-transparent, electrically conductive layer, e.g. indium-tin oxide (ITO). A cell is built up from these plates by fixing them with their electroconductively coated sides facing one another; the cell between the plates contains the electrochromic system. It is tightly sealed. The two plates can be separately provided with electric contacts and controlled via the conductive layers.

The electrochromic solution systems known from the above-cited prior art contain, in a solvent, pairs of redox substances which form coloured, positively or negatively charged, chemically reactive free radicals after reduction or oxidation. Examples are the viologen systems which have been known for a long time.

The pair of redox substances used here is in each case a reducible and an oxidizable substance. Both are colourless or have only a slight colour. Under the action of an electric potential, one substance is reduced and the other is oxidized, at least one becoming coloured. After switching off the potential, the two original redox substances are reformed, with decoloration or lightening of colour occurring.

It is known from U.S. Pat. No. 4,902,108 that suitable pairs of redox substances are those whose reducible substance has at least two chemically reversible reduction waves in the cyclic voltammogram and the oxidizable substance correspondingly has at least two chemically reversible oxidation waves. Systems of this type are suitable mainly for dimmable rear-view mirrors in cars. Since these are solution systems, use in electrochromic windows is not a possibility under normal circumstances.

Also known are systems in which the actual electrochromic redox pair is dispersed in a polymer matrix (see, for example, WO-A 96/03475). The undesirable effect of segregation is suppressed here.

Combinations of inorganic electrochromic components such as $WO_3$, NiO or $IrO_2$ are likewise known and are possibilities as components in an electrochromic window (see, for example, U.S. Pat. No. 5,657,149, Electronique International No. 276,16 (1997)).

These inorganic electrochromic components can be applied to the conductive substrate only by vapour deposition, sputtering or the sol-gel technique. As a result, systems of this type are very expensive to produce. In the context of efforts to replace an inorganic component by an organic polymer component, electrochromic systems, for example, based on the electrically conductive polymer polyaniline (PANI) and $WO_3$ as complementary electrochromic materials have become known (see, for example, B. P. Jelle, G. Hagen, J. Electrochem. Soc., Vol. 140, No. 12, 3560 (1993)). An attempt has also been made to use systems without an inorganic component, where the ITO or $SnO_2$ layer (counterelectrode) is supposed to serve as complementary electrochromic component to substituted poly(3,4-ethylenedioxy-thiophenes) (U.S. Pat. No. 5,187,608).

However, it is found that such electrochromic assemblies are unsuitable for ensuring a sufficient number of switching cycles without a change in the device properties. In addition, the electrochromic switching process by means of lithium ions is not fast enough for some applications. It has now been found that protons in the electrolyte layer in combination with poly-(3,4-dioxythiophenes) lead to a significantly shorter switching time.

The present invention provides electrochromic assemblies having a layer structure, characterized in that one layer comprises an electrically conductive, electrochromic polydioxythiophene, a further layer comprises an electrolyte containing a protic acid (Brpnsted acid) and a further layer comprises an ion reservoir compound or a mixture of ion reservoir compounds.

The polydioxythiophenes are cationically charged and built up of structural units of the formula (I)

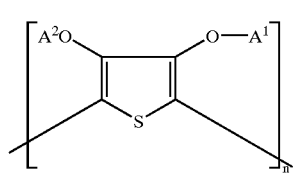

(I)

where $A^1$ and $A^2$ represent, independently of one another, substituted or unsubstituted ($C_1$–$C_4$)-alkyl or together form substituted or unsubstituted ($C_1$–$C_4$)-alkylene, and n represents an integer from 2 to 10,000, preferably from 5 to 5000, in the presence of polyanions.

Preferred cationic polydioxythiophenes are built up of structural units of the formula (Ia) or (Ib)

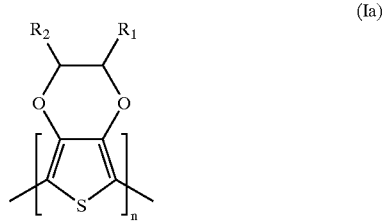

(Ia)

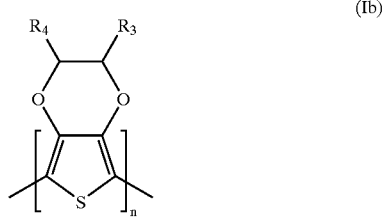

(Ib)

where $R_1$ and $R_2$ represent, independently of one another, hydrogen, substituted or unsubstituted ($C_1$–$C_{18}$)-alkyl, preferably ($C_1$–$C_{10}$)-, in particular ($C_1$–$C_6$)-alkyl, ($C_2$–$C_{12}$)-alkenyl, preferably ($C_2$–$C_8$)-alkenyl, ($C_3$–$C_7$)-cycloalkyl, preferably cyclopentyl, cyclohexyl, ($C_7$–$C_{15}$)-aralkyl, preferably phenyl-($C_1$–$C_4$)-alkyl, ($C_6$–$C_{10}$)-aryl, preferably phenyl, naphthyl, ($C_1$–$C_{18}$)-alkyloxy, preferably ($C_1$–$C_{10}$)-alkyloxy, for example methoxy, ethoxy, n- or iso-propoxy, or ($C_2$–$C_{18}$)-alkyloxy ester and $R_3$ and $R_4$ represent, independently of one another, hydrogen, but not both at the same time, or ($C_1$–$C_{18}$)-alkyl, preferably ($C_1$–$C_{10}$)-, in particular ($C_1$–$C_6$)-alkyl, ($C_2$–$C_{12}$)-alkenyl, preferably ($C_2$–$C_8$)-alkenyl, ($C_3$–$C_7$)-cycloalkyl, preferably cyclopentyl, cyclohexyl, ($C_7$–$C_{,5}$)-aralkyl, preferably phenyl-($C_1$–$C_4$)-alkyl, ($C_6$–$C_{10}$)-aryl, preferably phenyl, naphthyl, ($C_1$–$C_{18}$)-alkyloxy, preferably ($C_1$–$C_{10}$)-alkyloxy, for example methoxy, ethoxy, n- or iso-propoxy or ($C_2$–$C_{18}$)-alkyloxy ester, each substituted by at least one sulphonate group, n represents from 2 to 10,000, preferably from 5 to 5000.

Very particularly preferably, the electrochromic assembly of the invention contains at least one electrically conductive, electrochromic cationic or uncharged polydioxythiophene of the formula (IIa) and/or (IIb)

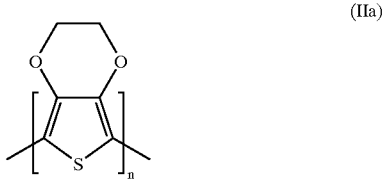

(IIa)

-continued

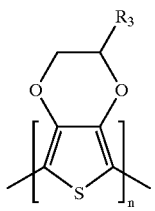

(IIb)

where
R$_3$ is as defined above,
n represents an integer from 2 to 10,000, preferably from 5 to 5000.

As polyanions, use is made of the anions of polymeric carboxylic acids such as polyacrylic acids, polymethacrylic acids or polymaleic acids and polymeric sulphonic acids such as polystyrenesulphonic acids and polyvinylsulphonic acids. These polycarboxylic and polysulphonic acids can also be copolymers of vinylcarboxylic and vinylsulphonic acids with other polymerizable monomers such as acrylic esters and styrenes.

Particular preference is given to the anion of polystyrenesulphonic acid as counterion.

The molecular weight of the polyacids which give the polyanions is preferably from 1000 to 2,000,000, particularly preferably from 2000 to 500,000. The polyacids or their alkali metal salts are commercially available, e.g. polystyrenesulphonic acids and polyacrylic acids, or can be prepared by known methods (see, for example, Houben Weyl, Methoden der organischen Chemie, Volume E 20 Makromolekulare Stoffe, Part 2, (1987), p. 1141 ff).

In place of the free polyacids required for forming the dispersions of polydioxythiophenes and polyanions, it is also possible to use mixtures of alkali metal salts of the polyacids and corresponding amounts of monoacids.

In the case of the formula (IIb), the polydioxythiophenes bear positive and negative charges in the structural unit. The preparation of the polydioxythiophenes is described, for example, in EP-A 0 440 957 (=U.S. Pat. No. 5,300,575).

The polydioxythiophenes are obtained by oxidative polymerization. This gives them positive charges which are not shown in the formulae since their number and position cannot be determined definitively.

The present invention accordingly provides an electrochromic assembly comprising electrically conductive poly-(3,4-ethylenedioxythiophene) derivatives as cathodically colouring electrochromic polymers and suitable ion reservoir layers for protons. An electrolyte comprising a crosslinked or uncrosslinked polymer, a protic acid and a particular amount of a solvent is located between the electrochromic polymer layer and the ion reservoir layer. The schematic structure is shown in FIG. 1, Principle 1).

Legend for FIG. 1:
1,2: Substrate
3,4: Electrically conductive coating, one of which can act as a mirror
5: Electrochromic polymer, e.g. PEDT/PSS
6: Ion reservoir layer
7: Electrolyte containing protic acid (crosslinked or uncrosslinked)
8,9: Fine metal grid (optional)

The electrochromic polymer layer is transparent in the doped state. This can be converted into a coloured form by uptake of electrons (reduction) at the cathode with acquisition of an absorbance in the visible region of the spectrum. The oxidation which proceeds on the opposite side (anode) is linked to an exchange reaction of the ion reservoir layer with protons. However, this reaction barely contributes to generation of colour so that it does not interfere.

The present invention accordingly provides a light-stabilized electrochromic solid-phase system comprising at least one redox-active, electrically conductive polymer selected from the group consisting of poly(3,4-alkylenedioxythiophene) derivatives which can be admixed with polystyrenesulphonate to make them processible from solution or bear a solubilizing sulphonate group in a side chain. This polymer layer is preferably applied from aqueous solution, with evaporation of the solvent leaving the solid, dry polymer film on the substrate. However, it should also be able to be applied by screen printing. The substrate used is preferably an electrically conductive, transparent glass or film system, with a layer of indium-tin oxide (ITO), fluorine-doped tin oxide (FTO, K-glass), undoped tin oxide or a layer of finely divided silver serving as electrode. It is also possible for one side of the electrode to consist of a metal layer (e.g. Al, Cu, Pd) which is no longer transparent (when used in a mirror). The electrolyte comprises at least one polymer (e.g. polyethylene oxide, polyvinyl alcohol, polyvinylpiperidine), at least one protic acid (e.g. phosphoric acid) and possibly a solvent.

The present invention provides not only for use as electrochromic device in glazing of buildings or architectural glazing and as vehicle glazing or sunroof but also for use as display element, as electrochromic mirror (e.g. self-dimming automobile rear-view mirror) and use in various optical elements.

For use as a mirror, one of the two electrodes can consist of a vapour-deposited or electrochemically deposited metal coating, e.g. aluminium, silver, copper, platinum, palladium, rhodium.

The present invention further provides a light-stabilized electrochromic system in which the colour-producing electrochromic polymer compound functions simultaneously as its own electrode, as a result of which only one conductive coating of ITO, fluorine-doped tin oxide or a metal is necessary (see, FIG. 1, principle II))

Legend for FIG. 1, principle II):
1,2: Substrate
4: Electrically conductive coating which can also act as a mirror
5: Electrochromic polymer
6: Ion reservoir layer
7: Electrolyte containing protic acid (crosslinked or uncrosslinked)
8,9: Fine metal grid (optional)

A particularly advantageous aspect of the electrochromic assembly of the invention is that it can be combined with a heat protection glass (commercially available for architectural glazing purposes) explicitly as a positive structural feature for energy-saving measures in rooms into which the sun shines strongly. Further explicit electrodes of other material are therefore not necessary since the heat-protection layer limits the transmission of IR radiation and at the same time, due to its electrical conductivity, takes over the electrode function in the electrochromic assembly.

The electrochromic assembly of the invention is also notable for the fact that the electrochromic layer can also absorb IR radiation in particular regions and thus can limit the transmission of heat through the pane.

The electrochromic layer assembly of the invention is suitable as a constituent of an electrochromic device. In an electrochromic device, the light-stabilized electrochromic layer assembly of the invention serves as a medium having variable transmission, i.e. the light transmittance of the system changes under the action of an electric potential by going from a colourless state to a coloured state. The present invention therefore also provides electrochromic devices in which an electrochromic assembly according to the invention is present. Applications of this electrochromic device are in architectural glazing and in vehicles, e.g. as window pane, car sunroof, automobile rear-view mirror, display or as optical element or as constituent of information display units such as instrument displays in vehicles of any type. It can likewise be used as a window in greenhouses.

If the electrochromic device is an electrochromic display device, one or both of the two conductive layers is/are divided into electrically separate segments which are individually provided with contacts.

It is, however, also possible for only one of the two plates to have a conductive coating and be divided into segments. The segments can be separated, for example, by mechanical removal of the conductive layer, e.g. by scoring, scratching, scraping or milling or by chemical means, for example by etching using, for example, a hydrochloric acid solution of $FeCl_2$ and $SnCl_2$. This removal of the conductive layer can be controlled in terms of location by means of masks, e.g. masks of photoresist. However, the electrically separate segments can also be produced by targeted, e.g. by means of masks, application, e.g. sputtering or printing, of the conductive layer. The provision of the segments with contacts is carried out, for example, by means of fine strips of conductive material, so that the segment is electrically connected to a contact at the edge of the electrochromic device. These fine contact strips can consist of the same material as the conductive layer itself and, for example, be produced together with it in the division of the layer into segments, as described above. However, they can also consist, e.g. for improving the conductivity, of other material such as fine metallic conductors, for example of copper or silver. A combination of metallic material and the material of the conductive coating is also possible. These metallic conductors can, for example, be applied in fine wire form, e.g. adhesively bonded-on, or be printed on. All these techniques just described are generally known from the production of liquid crystal displays (LCDs).

In the case of displays, the displays according to the invention can be viewed in transmitted light or reflectively via mirroring.

If the electrochromic device is an electrochromic window, a fine metal grid can be vapour-deposited onto one or both electrodes. This serves to improve the surface conductivity of the substrates and is advantageous in the case of large areas in order to achieve a uniform colour.

The light-stabilized electrochromic assembly of the invention preferably incorporates at least one transparent, electrically conductive coating comprising indium-tin oxide ($In_2O_3$: $SnO_2$ (ITO)), tin oxide ($SnO_2$), fluorine-doped tin oxide ($SnO_2$: F; FTO or "K glass", "heat protection glass"), antimony-doped tin oxide, antimony-doped zinc-oxide, aluminium-doped zinc oxide or a transparent metal film having a sufficiently thin thickness, e.g. silver coating (heat protection glass) on a substrate (glass or plastic).

Other conductive polymers such as substituted or unsubstituted polythienyls, polypyrroles, polyanilines, polyacetylene or polythiophenes can also be used.

In the light-stabilized assembly of the invention, the actual electrochromic polymer can also be used advantageously as its own conductive electrode material in place of one of the abovementioned conductive coatings.

Very particular preference is given to using indium-tin oxide ($In_2O_3$: $SnO_2$ (ITO)), zinc oxide ($SnO_2$), fluorine-doped tin oxide ($SnO_2$: F; FTO, "K glass", "heat protection glass") or a transparent silver coating having a sufficiently thin thickness (heat protection glass, e.g. ®PLANITHERM from Saint-Gobain, or heat protection film).

If one of the plates is mirrored, this conductive layer can also be utilized. Particular preference is here given to using silver, aluminium, copper, platinum, palladium and rhodium.

The light-stabilized electrochromic assembly of the invention preferably includes a transparent electrolyte which can be considered a polymer electrolyte or polyelectrolyte and comprises the following components:

polymer (crosslinked or uncrosslinked)

protic acid.

Preferred polymers here are polymethyl methacrylate (PMMA), polyethylene oxide (PEO), polyvinyl alcohol (PVA), polyvinylpiperidine (PVP), polystyrenesulphonic acid (PSS), polyvinylsulphonic acid (polyVSA), poly(2-acrylamido-2-methyl-propanesulphonic acid (polyAMPS), polyethylenesulphonic acid (polyESA), polyacrylonitrile (PAN), poly(N,N,-dimethylacrylamide), poly(2-(2-methoxyethoxy)-ethoxy)phosphazene, poly(oxymethylene-oligo(oxyethylene)), polyethylene glycols (PEGs), polypropylene glycols (PPGs) or polymers based on polyepichlorohydrin or polyethers and also mixtures. Copolymers such as ethyhlene oxide-propylene oxide (EO/PO) copolymer or oxymethylene-bridged polyethylene oxides can also be used.

Particular preference is given to using polyethers and polyethylene oxides, which may also be crosslinked.

Particular preference is also given to modified siloxanes derived from, for example, gamma-glycidylpropyltrimethoxysilane. These can be, for example, variants modified by means of propylene oxide.

The electrolytes can also contain, apart from the UV absorbers, organic and/or inorganic fillers or additives. Here, the customary additives such as thermostabilizers, optical brighteners, flame retardants, flow improvers, dyes, pigments, fillers or reinforcing materials, finely divided minerals, fibrous materials, chalk, quartz flour, glass, aluminium oxide, aluminium chloride and carbon fibres can be added in customary amounts. The function of a spacer can be assumed, for example, by glass spheres, polymer particles, silica gel or sand grains having a defined size, if this is necessary.

Preferred protic acids are sulphonic acids, in particular trifluoromethanesulphonic acid, phosphoric acid or imidazole compounds. The protic acids can be present as a solution in the electrolyte or can be present in immobilized form in a polymer, for example polystyrenesulphonic acid.

Very particular preference is here given to phosphoric acid.

Substrates used in the light-stabilized electrochromic assembly of the invention are glass or various types of plastic.

Preference is given to generally transparent substrates of any type.

Particularly preferred materials are glass, specifically heat protection glass for the application as electrochromic window (in thicknesses of 10 $\mu$m in the case of "flexible glass, thin glass" up to 3 cm) and also polyesters (e.g. polyethylene terephthalate (PET), or polyethylene naphthalate (PEN)), various types of polycarbonate (e.g. ®Makrolon, APEC-HT), polysulphones, polyimides and polycycloolefins. The polymeric substrate can be used as a flexible film or as a thick plate. The substrate can also be curved, so that the assembly of layers matches the shape of the base. A flexible plastic substrate can, after construction of the total electrochromic system, also be laminated onto or adhesively bonded onto various bases such as curved glass.

The plastic substrates can be additionally provided with barrier layers against water and oxygen.

Preference is here given to $TiO_x$, $SiO_x$ on polyester, e.g. polyethylene terephthalate, Du Pont, (cf. packaging films) or fluorinated polymers and possible combinations thereof and also barrier layers based on inorganic-organic hybrid systems.

The electrochromic assembly of the invention can, when configured as a flexible film system, be laminated or adhesively bonded as a complete electrochromic composite system onto the safety glass panes of cars. It can also be integrated into the hollow space of a composite glass pane system in architectural glazing.

The control mechanism of the electrochromic assembly is based on the reversible electrochemical doping of the electrochromic polymer which results in great colour changes, for example from colourless to blue. The assembly is controlled by means of defined voltages.

The reduction and oxidation processes in the electrochromic assembly of the invention generally occur by uptake and release of electrons at the cathode and anode respectively, with the potential difference between the electrodes preferably being from 0.1 to 5 V, very particularly preferably from 0.1 to 3 V. After switching off the electric potential, the previously achieved colour can be maintained for a prolonged period (memory effect) so that a permanent colour can be achieved with minimal energy consumption. Brief reversal of the polarity can spontaneously achieve charge neutralization and thus decoloration.

In the case of relatively large areas, the electrochromic assembly of the invention is also characterized in that it can be supplied with power by means of solar modules.

To improve wetting of the substrate, it is also possible to add a wetting agent (e.g. Fluortensid).

EXAMPLES

Example 1

Application of an Electrochromic Polymer to a Conductive Substrate

The polymer Baytron® P (aqueous dispersion of the conductive polymer PEDT/PSS, polyethylenedioxythiophene-polystryrenesulphonate from Bayer AG)

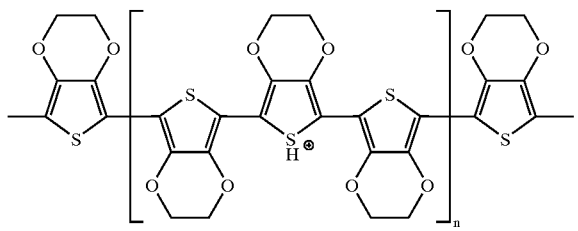

-continued

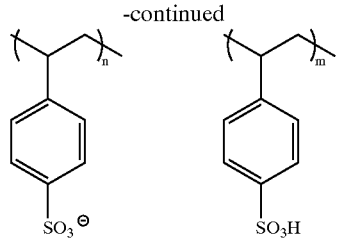

is applied from an aqueous solution which still contains isopropanol to the electrically conductive side of a K-glass plate (heat protection glass from Flachglas, surface resistance: ~20 Ω/sq) by means of a spin coater, with 4 applications of 15 seconds each being made at a rotational speed of 1500 rpm. During application, the solvent is evaporated by means of a hair dryer.

This gives a transparent, only very slightly bluish polymer film. Measurement of the thickness of the layer using a profilometer gave a value of 0.6 μm.

Example 2

Application of an Ion Reservoir Layer of Nickel Oxide to K-glass

In an aqueous solution of nickel sulphate, $NiSO_4.6H_2O$ (0.1 M) and ammonium hydroxide, $NH_4OH$ (0.1 M), hydrated nickel oxide is deposited anodically at a voltage of 3 V on the conductively coated $SnO_2$:F side of K-glass (duration: 10–20 seconds). The slightly brownish coating obtained in this way is subsequently heated at 200° C. for 1 hour. This gives completely transparent nickel oxide layers which are suitable as ion reservoir layers in electrochromic assemblies.

Example 3

Preparation of the Electrolyte 2 g of polyethylene oxide (PEO; MW=200 000) are admixed with 1 g of anhydrous phosphoric acid and stirred well. This gives a viscous electrolyte which is ready to use.

Example 4

Manufacture of the Complete Electrochromic Cell

The electrolyte from Example 3 is applied in a film thickness of 200 μm to the ion reservoir layer from Example 2 and brought into contact with the electrochromic PEDT/PSS layer from Example 1. After adhesively bonding the cell edges to one another, a functional electrochromic cell is obtained.

Example 5

The function of the cell from Example 4 is tested by application of 2.5 V from a DC source. Reversal of the voltage enables both states (coloured/uncoloured) to be demonstrated.

What is claimed is:

1. Electrochromic assemblies having a layer structure, characterized in that one layer comprises an electrically conductive, electrochromic polydioxythiophene, a further layer comprises an electrolyte containing a protic acid and a further layer comprises an ion reservoir compound or a mixture of ion reservoir compounds.

2. Electrochromic assemblies according to claim 1, characterized in that the polydioxythiophenes are cationically charged and are built up of structural units of the formula (I)

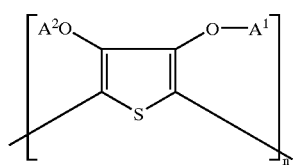

(I)

where
A¹ and A₂ represent, independently of one another, substituted or unsubstituted $(C_1-C_4)$-alkyl or together form substituted or unsubstituted $(C_1-C_4)$-alkylene, and
n represents an integer from 2 to 10,000,
and the counterions are polyanions.

3. Electrochromic assemblies according to claim 2, characterized in that the polydioxythiophenes are built up of structural units of the formula (Ia) or (Ib)

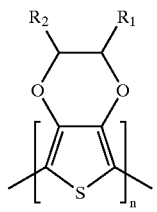

(Ia)

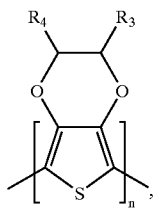

(Ib)

where
$R_1$ and $R_2$ represent, independently of one another, hydrogen, substituted or unsubstituted $(C_1-C_{18})$-alkyl, $(C_2-C_{12})$-alkenyl, $(C_3-C_7)$-cycloalkyl, $(C_7-C_{15})$-aralkyl, $(C_6-C_{10})$-aryl, $(C_1-C_{18})$-alkyloxy or $(C_2-C_{18})$-alkyloxy ester and
$R_3$ and $R_4$ represent, independently of one another, hydrogen, but not both at the same time, or $(C_1-C_{18})$-alkyl, $(C_2-C_{12})$-alkenyl, $(C_3-C_7)$-cycloalkyl, $(C_7-C_{15})$-aralkyl, $(C_6-C_{10})$-aryl, $(C_1-C_{18})$-alkyloxy or $(C_2-C_{18})$-alkyloxy ester, each substituted by at least one sulphonate group,
n represents a number from 2 to 10,000.

4. Electrochromic assemblies according to claim 3, characterized in that the polydioxythiophenes are built up of structural units of the formula (IIa) or (IIb)

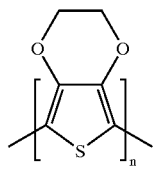

(IIa)

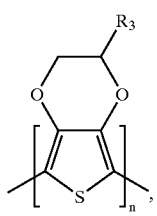

(IIb)

where
$R_3$ and n are as defined in claim 3.

5. Electrochromic assemblies according to claim 2, characterized in that the polyanions are anions of polymeric carboxylic acids and/or polymeric sulphonic acids.

6. Electrochromic assemblies according to claim 1, characterized in that at least one transparent, electrically conductive coating on a substrate is present.

7. Electrochromic assemblies according to claim 1, characterized in that the conductive electrode material is an electrically conductive polydioxythiophene.

8. Electrochromic assemblies according to claim 1, characterized in that a transparent electrolyte comprising the following components:
polymer (crosslinked or uncrosslinked)
protic acid is present.

* * * * *